(12) United States Patent
Lohr, Sr.

(10) Patent No.: US 8,499,997 B2
(45) Date of Patent: Aug. 6, 2013

(54) CARTRIDGE FOR THE GENERATION OF HYDROGEN FOR BONDING MATERIALS

(75) Inventor: Peter James Lohr, Sr., Morganton, NC (US)

(73) Assignee: Advanced Hydrogen Technologies Corporation, Morgantown, NC (US)

( * ) Notice: Subject to any disclaimer, the term of this patent is extended or adjusted under 35 U.S.C. 154(b) by 0 days.

(21) Appl. No.: 13/170,928

(22) Filed: Jun. 28, 2011

(65) Prior Publication Data

US 2012/0223124 A1  Sep. 6, 2012

Related U.S. Application Data

(63) Continuation-in-part of application No. 12/401,651, filed on Mar. 11, 2011, now Pat. No. 7,967,879.

(51) Int. Cl.
*B23K 20/08* (2006.01)
*B01J 3/00* (2006.01)

(52) U.S. Cl.
USPC ........... 228/107; 422/162; 422/164; 422/165; 422/166; 48/61; 228/2.5

(58) Field of Classification Search
USPC ....... 422/162, 164, 165, 166; 48/61; 228/107, 228/2.5
See application file for complete search history.

(56) References Cited

U.S. PATENT DOCUMENTS

| | | | |
|---|---|---|---|
| 4,000,022 A | 12/1976 | Beckert et al. | |
| 5,012,719 A | 5/1991 | Goldstein et al. | |
| 5,052,272 A | 10/1991 | Lee | |
| 5,143,047 A | 9/1992 | Lee | |
| 5,634,341 A | 6/1997 | Klanchar et al. | |
| 6,989,210 B2 | 1/2006 | Gore | |
| 7,052,658 B2 | 5/2006 | Arthur et al. | |
| 2005/0258159 A1 | 11/2005 | Hale et al. | |
| 2006/0117659 A1 | 6/2006 | McLean | |
| 2006/0204799 A1 | 9/2006 | Ishikawa et al. | |
| 2007/0068521 A1 | 3/2007 | Wang et al. | |

OTHER PUBLICATIONS

Copending U.S. Appl. No. 13/171,178, Cartridge for the Generation of Hydrogen for Mechanical Power, filed Jun. 28, 2011, Lohr.
Copending U.S. Appl. No. 13/170,865, Cartridge for the Generation of Hydrogen for Mechanical Power, filed Jun. 28, 2011, Lohr.

*Primary Examiner* — Jill Warden
*Assistant Examiner* — Lessanework Seifu
(74) *Attorney, Agent, or Firm* — Thomas D. McClure, Jr.

(57) ABSTRACT

The present invention provides assembly for use with a cartridge for the generation of hydrogen and a method for bonding metals with the cartridge. The cartridge includes a case, an igniter, and a structural component. The case defines an interior cavity and the igniter is positioned within the cavity. The structural component is also positioned within the cavity and is formed of a particulate embedded in a matrix and the particulate includes a metallic material. An oxidizing agent is positioned within the cavity. The structural component is configured such that the metallic material and the oxidizing agent react together to generate hydrogen after the igniter generates sufficient heat to remove the matrix from the structural component and to initiate the reaction between the metallic material and the oxidizing agent. The cartridge is positioned within the assembly relative to a metal flyer such that when the cartridge is discharged, the flyer is bonded to a metal anvil.

20 Claims, 9 Drawing Sheets

CARTRIDGE FOR THE GENERATION OF HYDROGEN FOR BONDING MATERIALS

PRIORITY

This application is a continuation-in-part of U.S. patent application Ser. No. 12/401,651 filed on Mar. 11, 2009, which is incorporated herein in its entirety.

FIELD OF THE INVENTION

The invention relates generally to the generation of hydrogen and specifically to a cartridge for the generation of hydrogen for the bonding of materials such as metals.

BACKGROUND OF THE INVENTION

Hydrogen can be used as a source of energy in many hydrogen-consuming systems such as fuel cells, internal combustion engines, and portable power equipment and tools. Devices that consume hydrogen for energy must be connected to a source for hydrogen such as those that directly utilize hydrogen in either liquid or gaseous form and those that utilize hydrogen in chemical compounds such as water. Some of the systems that store such chemically bonded hydrogen utilize a cartridge for containing the water along with other components. When hydrogen is stored in chemical compounds such as water, it must be converted to consumable hydrogen by a reaction prior to use as hydrogen.

One conventional process for releasing bonded hydrogen from water is electrolysis. During electrolysis, an electrical differential is applied to water at a cathode and an anode, and an advantage of this system is that a low voltage of electricity can be used. Another reaction to release hydrogen from water is that of aluminum and water to generate aluminum oxide and hydrogen gas. This reaction can be self sustaining, but it requires high temperatures to generate substantial hydrogen production. One way to do this is by heating aluminum and water that are in close proximity with thermite, but most conventional systems for igniting the thermite require a high voltage differential.

Therefore, one problem with such cartridges is that high voltages are required to initiate the reaction. Another problem with cartridges configured to generate hydrogen through the reaction of a metal with an oxidizing agent is that the reaction can proceed prematurely because of contact between the reactants. Another problem is that structure utilized to form the cartridge and to contain the reactants remains as waste after the cartridge is used. Another problem is that the cost of conventional cartridges is too high to allow for economical one-time use, i.e. conventional cartridges are not expendable.

A specific industry in which the cartridge of the present invention can be used is the manufacturing process for joining dissimilar materials—dissimilar metal welding, bonding, explosive welding, impact welding, clad bonding, cladding. Explosive welding of dissimilar metals, also called explosion bonding, uses the detonation of explosives to accelerate metals to collide and fuse together. Explosion bonding is needed for specific products that need to retain the properties of two different metals. For example, the weight savings of aluminum and the corrosion resistance of stainless steel. Another advantage of explosion bonding is for small parts that do not have sufficient material space for conventional fasteners. Additionally, this method provides a way to hermetically seal joints for vacuum chambers and medical or chemical containment as well as providing transition joints that are not disruptive to electrical conductivity.

It is believed that cartridges of the present invention are safe to store, transport, and handle. This feature is useful for providing a versatile portable tool. It is also believed that the present invention would support an inexpensive assembly line manufacturing environment and provide a user=friendly method for bonding dissimilar metals. In one embodiment, the welding tool can be portable and capable of solid state welding of parts to large objects in remote field locations such as armored vehicles, ships and industrial plants.

One problem with conventional methods of explosive welding is high cost due to safety requirements related to the handling of high explosives, including large, isolated bonding facilities.

Another problem with conventional explosive welding processes, is that generally relatively large components are combined together without significant regard for the dimensions of the final product. The bonded plates are then processed such that excess material is removed and the final product is produced. This sequence produces a lot of waste, handling time, and machining time.

Yet another problem with conventional explosive welding processes is that large amounts of dust are created.

The dissimilar welding method of the present invention is safer than that of conventional explosive bonding because the cartridge must be contained in a chamber configured to generate sufficient pressures such that the aluminum and hydrogen reaction and proceed toward completion. In this regard, it is believed that accidental discharges are not possible.

One advantage of the present invention is that it is believed that the flyer plate might be exposed to less stress and deformation than seen in conventional methods.

SUMMARY OF THE INVENTION

The present invention provides a cartridge for the rapid generation of hydrogen very rapidly in response to demand, at high pressures, and at high temperatures. The cartridge includes consumable structural components such that solid waste remaining after discharge of a cartridge is minimized. In addition, the cartridge of the present invention is configured for use in a system that provides hydrogen at a generally constant pressure. The present invention provides and apparatus and method for generating hydrogen at pressures sufficient to bond dissimilar metals.

According to one embodiment of the present invention, there is provided an assembly or fixture for bonding materials, the fixture includes: a cartridge for the generation of hydrogen, that includes a case that defines an interior cavity, an igniter positioned within the cavity, an oxidizing agent positioned within the cavity; a structural component positioned within the cavity, the structural component being formed of a particulate embedded in a matrix and the particulate includes a metallic material, wherein the structural component is configured such that the metallic material and the oxidizing agent react together to generate hydrogen after the igniter generates sufficient heat to remove the matrix from the structural component and to initiate the reaction between the metallic material and the oxidizing agent; and a flyer. The cartridge is positioned relative to the flyer such that when the cartridge is discharged, the flyer is displaced into an anvil with sufficient force that the flyer is bonded to the anvil.

According to one aspect of the present invention, the structural component that is configured to generally maintain the position of the igniter relative to the case.

According to one aspect of the present invention, the structural component is also configured to define a plurality of chambers within the cavity and the oxidizing agent is positioned within the plurality of chambers.

According to one aspect of the present invention, the matrix includes nitrocellulose.

According to one aspect of the present invention, the case is also formed of the particulate embedded in the matrix.

According to one aspect of the present invention, the igniter includes thermite.

According to one aspect of the present invention, the oxidizing agent is water.

According to one aspect of the present invention, the water is gelatinized.

According to one aspect of the present invention, the metallic material includes aluminum.

According to one aspect of the present invention, an electrical element is positioned within the igniter and is electrically connected with an exterior surface of the case.

According to one aspect of the present invention, the igniter is configured to ignite when a voltage is applied to the electrical element and the igniter is configured to generate sufficient heat such that at a least a portion of the matrix is removed from the structural component thereby exposing sufficient metallic material to the oxidizing agent at a sufficiently high temperature to initiate a chemical reaction between the oxidizing agent and the metallic material thereby generating hydrogen.

According to one aspect of the present invention, the case includes a metallic cap that is electrically connected to the electrical element such that the cap forms part of an electrical circuit when the voltage is applied to the electrical element.

According to one aspect of the present invention, the cap is configured to rupture such that an opening is defined through the cap for the release of hydrogen therethrough and such that the ruptured cap is retained in contact with the case.

According to another embodiment of the invention, there is provided a method of bonding that includes the steps of: providing a cartridge for the generation of hydrogen, that includes a case that defines an interior cavity, an igniter positioned within the cavity, an oxidizing agent positioned within the cavity; a structural component positioned within the cavity, the structural component being formed of a particulate embedded in a matrix and the particulate includes a metallic material, wherein the structural component is configured such that the metallic material and the oxidizing agent react together to generate hydrogen after the igniter generates sufficient heat to remove the matrix from the structural component and to initiate the reaction between the metallic material and the oxidizing agent; and a flyer wherein the cartridge is positioned relative to the flyer such that when the cartridge is discharged, the flyer is displaced into an anvil with sufficient force that the flyer is bonded to the anvil; discharging the cartridge; and bonding the flyer to the anvil.

According to another embodiment of the present invention, there is provided a method for bonding. The method includes the steps of providing a cartridge that includes a case, an igniter, and an insert. The case defines an interior cavity. The igniter is configured to ignite when an electrical element embedded therein is exposed to an electrical voltage differential. The insert is configured to define a plurality of chambers within the cavity and the insert includes aluminum particles that are embedded in a nitrocellulose matrix. An oxidizing agent including chemically bonded hydrogen is positioned within each chamber. The igniter is configured to initiate a reaction between the aluminum particles and the oxidizing agent that generates hydrogen. The method also includes the steps of discharging the cartridge, propelling a flyer, and bonding the flyer to an anvil to form a bonded part.

According to one aspect of the present invention, the method includes the further steps of: ejecting the bonded part; loading another cartridge from a magazine automatically; loading another flyer from a magazine automatically; loading another anvil from a magazine automatically; discharging the another cartridge automatically such that another bonded part is formed; and ejecting the another bonded part.

According to one aspect of the present invention, the pressure within the cavity increases such that a portion of the case ruptures and hydrogen is discharged from the cavity.

According to one aspect of the present invention, substantially all material created by the reaction other than hydrogen remain associated with the case.

According to one aspect of the present invention, the binder forms a coating on a solid metal spacer.

According to one aspect of the present invention, the metallic insert includes aluminum powder in a nitrocellulose matrix.

According to one aspect of the present invention, a wad is positioned between the cartridge and the flyer.

According to one aspect of the present invention, the wad is adhered to the flyer.

According to one aspect of the present invention, the flyer has a first bonding surface and the anvil has a second bonding surface and the first bonding surface is positioned at an angle relative to an imaginary line that is parallel to the second bonding surface.

According to one aspect of the present invention, the anvil is contained within the fixture.

According to one aspect of the present invention, the anvil is adhered to a backer.

BRIEF DESCRIPTION OF THE DRAWINGS

For a fuller understanding of the nature and objects of the present invention, reference should be made to the following detailed description taken in connection with the accompanying drawings, wherein.

DETAILED DESCRIPTION OF THE PREFERRED EMBODIMENTS

Embodiments of the present invention are directed to a cartridge for the rapid generation of hydrogen from a first reactant that contains hydrogen and a second reactant that contains metal. The reaction can be initiated by a low electrical voltage and consumes at least some of the structure required to position the reactants such that they are sufficiently close to each other and to an igniter for the rapid reaction to be initiated by the igniter.

Referring to FIGS. 1-3 and 6, in accordance with an embodiment of the invention, a cartridge 10 for generating hydrogen includes a case 20 configured to receive a cap 50, an ignition assembly 70, and a spacer 100. The cartridge 10 is configured to be received in a reaction assembly 200 and discharged therein to generate hydrogen.

Figure 1:
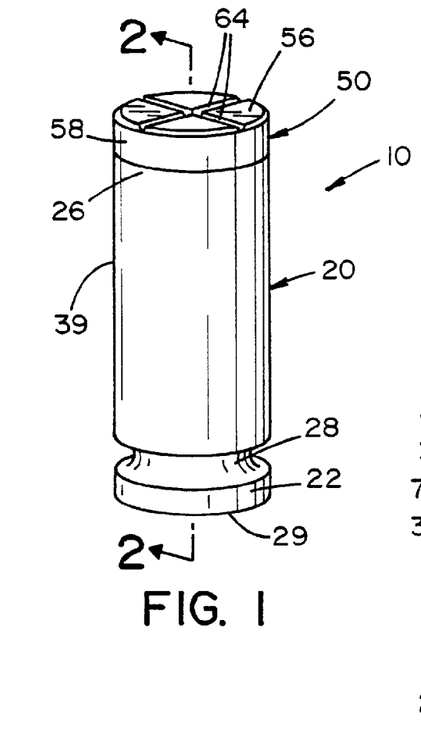
FIG. 1 is a perspective view of a cartridge according to one embodiment of the present invention.
Figure 2:
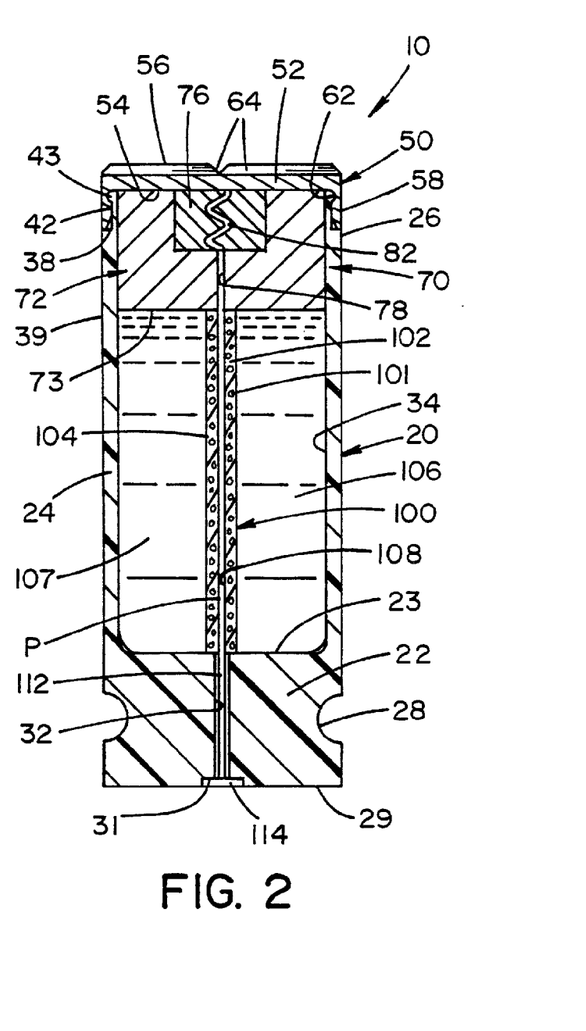
FIG. 2 is a side cutaway view of the cartridge of FIG. 1 taken along line 2-2.
Figure 3:
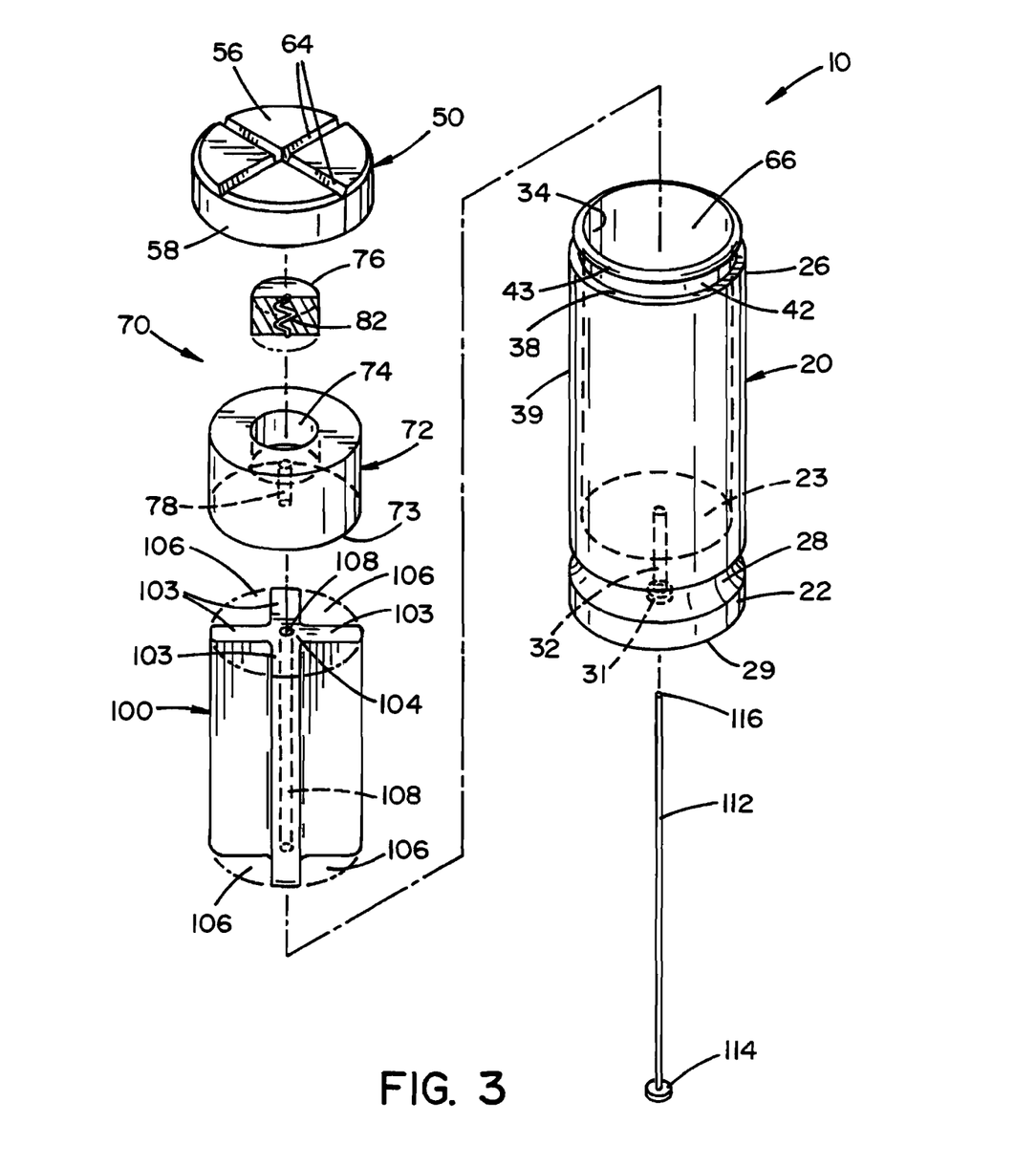
FIG. 3 is a partially-cutaway, expanded view of the cartridge of FIG. 1.

As shown in FIGS. 1, 2, and 3; cartridge 10 includes a generally cup-shaped case 20 having a closed end 22. A circumferential groove 28 is defined around case 20 at closed end 22, and groove 28 is spaced-away from an outer surface 29 of closed end 22. Closed end 22 is shaped such that outer surface 29 defines a recess 31. Closed end 22 also defines an inner surface 23.

Figure 4:
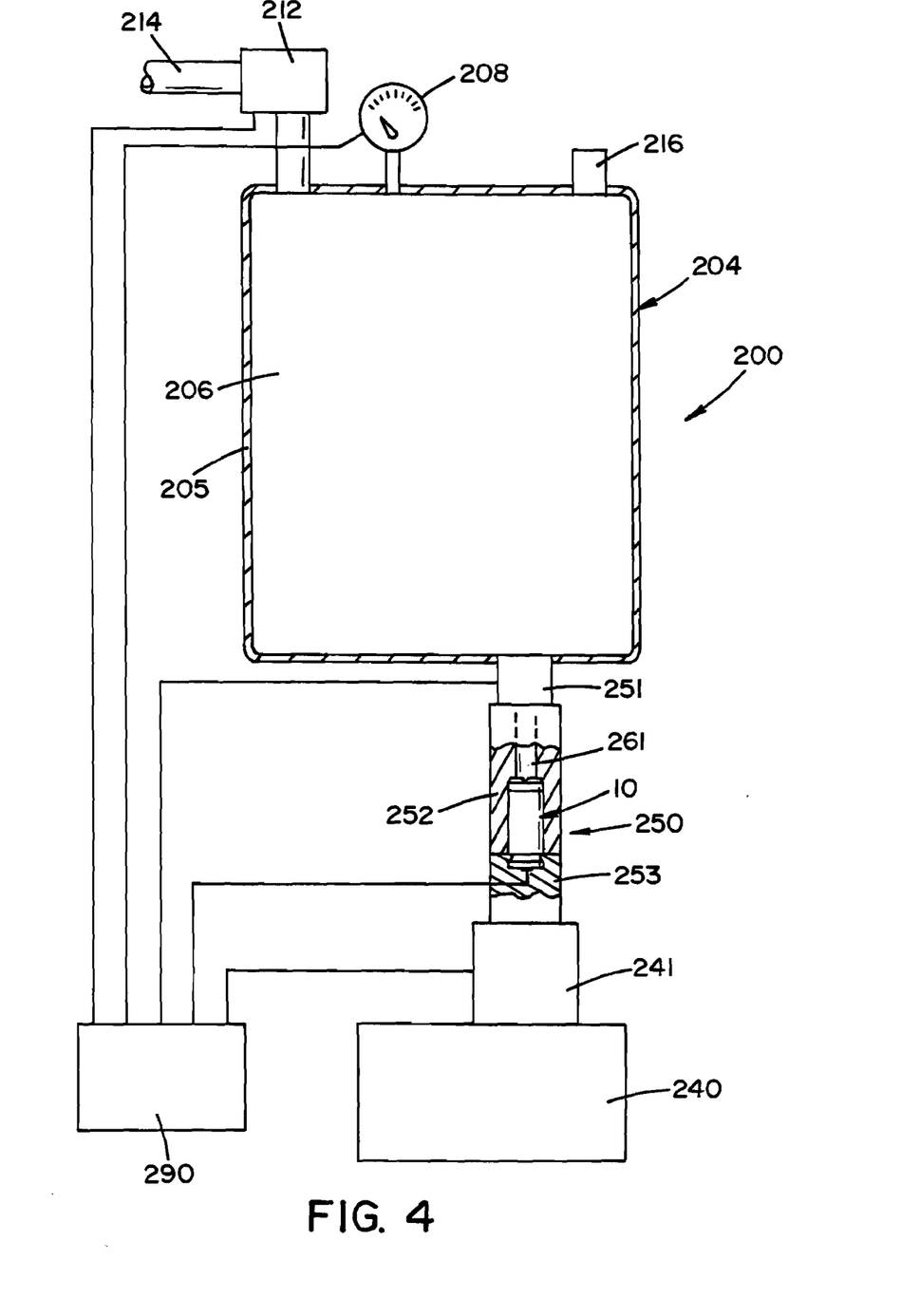
FIG. 4 is a cutaway side view of a discharge assembly.

Case 20 includes a wall 24 that extends away from closed end 22 toward an open end 26 and defining an inner surface 34. Surface 34 and surface 23 define a cup-shaped cavity 66. A first passageway 32 is defined through the closed end 22 of case 20 such that it extends from recess 31 to inner surface 23 thereby connecting outer surface 29 with cup-shaped cavity 66. A shoulder 38 that extends from an outer surface 39 of wall 24 to a land area 42 is defined by wall 24. Additionally, a lip 43 is formed by wall 24 at open end 26 of case 20. When positioned in a firing chamber 250 as shown in FIG. 4, wall 24 of case 20 is configured to deform such that a low pressure seal is formed at a predetermined pressure within cavity 66 as will be discussed further below regarding cap 50.

In the illustrated embodiment, case 20 is formed of a thermoplastic material. By way of example and not limitation, case 20 can be formed of one of the following: nitrocellulose, cellulose, metal, metallic material, thermoplastic, or a combination thereof. By way of example and not limitation, the thermoplastic can include polycarbonate (commercially known by various trade names including Lexan®), polyoxymethylene (commercially known by various trade names including Delrin®), polymethyl methacrylate (commercially known by various trade names including Plexiglas®),and a combination thereof.

Continuing to refer to FIGS. 1, 2, and 3; cap 50 includes a generally circular wall 52 that defines an inner surface 54 and an outer surface 56. Cap 50 is positioned across the open end 26 of cup-shaped case 20 such that cavity 66 is enclosed. A flange 58 is positioned around the circumference of wall 52 of cap 50 and extends away from inner surface 54 of wall 52. Flange 58 has a circumferential recess 62 formed therein that is configured to engage lip 43 of case 20, and thus be retained on open end 26 of case 20. As can be seen in FIG. 1, a plurality of grooves 64 are formed on the outer surface 56 of cap 50. In the illustrated embodiment, grooves 64 are positioned to form a cross-shaped pattern, but it should be appreciated that in other embodiments, grooves 64 can have other configurations.

Figure 6:
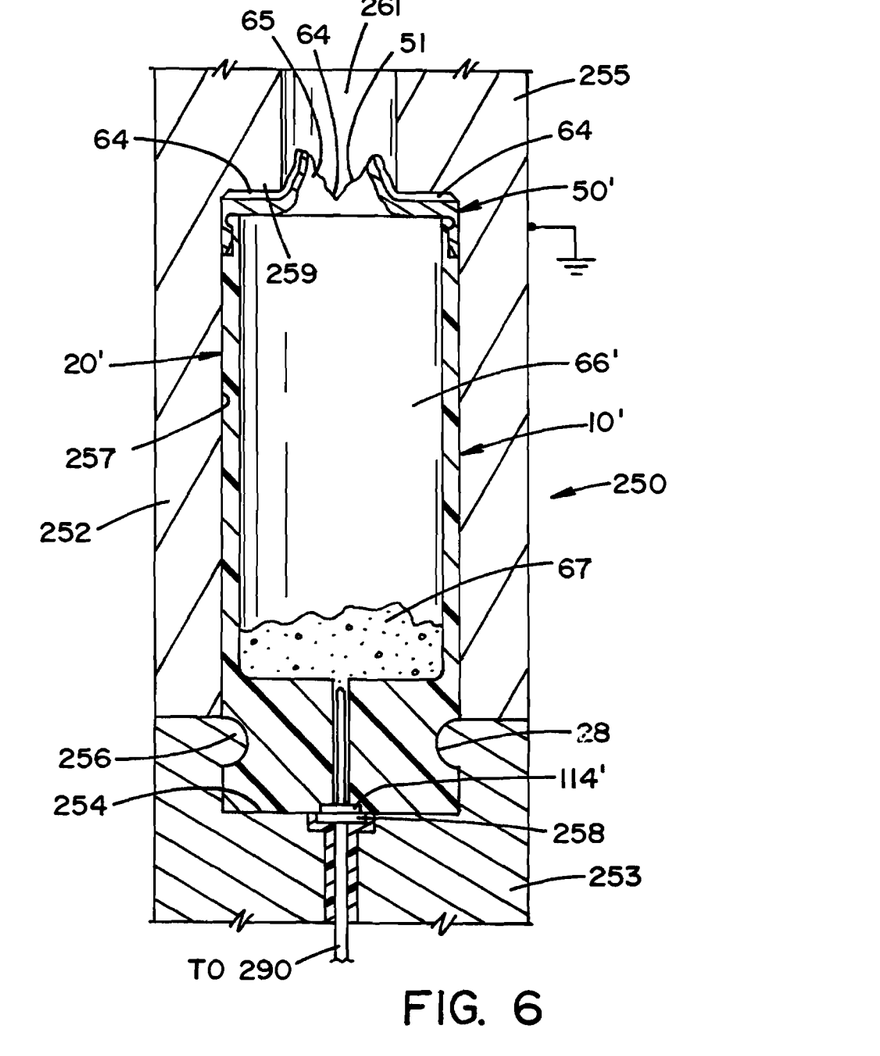
FIG. 6 is a cutaway side view of a firing chamber showing a spent cartridge.

Grooves 64 of cap 50 are dimensioned to fail at a predetermined rupture pressure. The rupture pressure is less than a peak, i.e. maximum, pressure generated within cavity 66 by the reaction of the metallic first reactant and the oxidizing second reactant in cartridge 10 in firing chamber 250. Thus cap 50 is configured as a burst disk such that cap 50 is configured to preferentially rupture to form an opening 51 in wall 52 as shown in FIG. 6. Opening 51 is configured to fluidly connect cavity 66 with a region outside of cartridge 10.

Preferably, the rupture pressure is between about 500 psi and about 15,000 psi; more preferably, the rupture pressure is between about 3,000 psi and about 13,000 psi; and even more preferably, the rupture pressure is between about 9,000 psi and about 11,000 psi. As shown in FIG. 6, a least one petal 65 is formed when cap 50 ruptures along grooves 64. Preferably, petal 65 remains attached to flange 58 and flange 58 remains engaged with case 20. In this manner, the components of cap 50 that remain after discharge of cartridge 10 are retained on case 20 and can be recycled or disposed of along with case 20.

In the illustrated embodiment, cap 50 is formed of a metal. By way of example and not limitation, cap 50 can include at least one of the following: stainless steel, brass, nitrocellulose, a fiber reinforced resin, electrically conductive elements, and a combination thereof.

As shown in FIG. 3, spacer 100 is positioned within cavity 66. In the illustrated embodiment, spacer 100 is generally longitudinal and has a plurality of ribs 103 that are distributed radially around a central core 104. A passageway 108 is formed through core 104 of spacer 100. Each rib 103 extends toward inner surface 34 of wall 24 such that a plurality of chambers 106 are defined by ribs 103, inner surface 34 of wall 24 and closed end 22, and the base surface 73 of primary ignition block 72. The plurality of chambers 106 are radially disposed and are configured to receive an oxidizing agent such as water 107. Alternatively, spacer 100 can be configured as cylinder that defines a central chamber or a cylinder that defines a first central chamber and a second annular chamber. In further alternatives, wall 24 includes radially disposed ribs that extend into cavity 66 and there is no spacer 100. In this embodiment, path P is formed along one of the radially disposed ribs.

Figure 5:
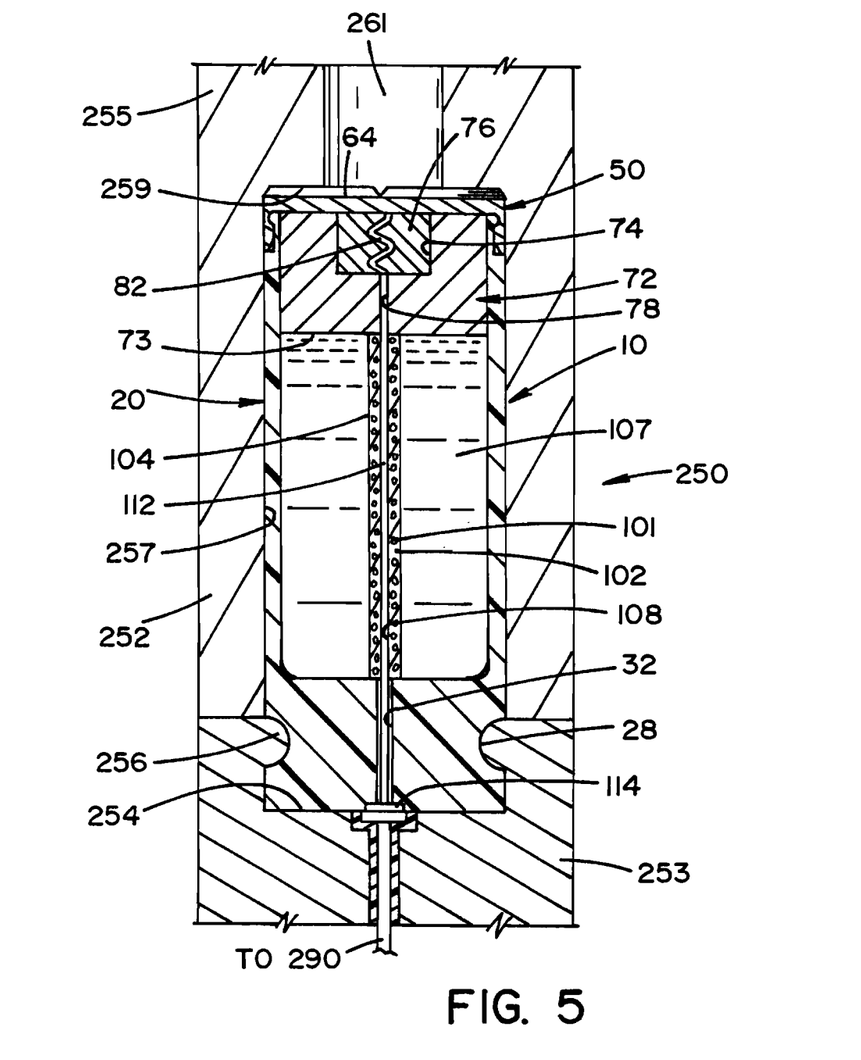
FIG. 5 is a cutaway side view of a firing chamber showing an unspent cartridge.

In the illustrated embodiment, spacer 100 includes a metallic particulate 101 that is embedded in a matrix 102 as can be seen in FIG. 5. Metallic particulate 101 includes the metal first reactant. Matrix 102 is formed of a binding agent and is configured to be substantially impermeable to the oxidizing second reactant such the metallic particulate 101, and thus the metal first reactant, is substantially isolated from the water 107. In addition, matrix 102 is consumable during the rapid reaction of the metal first reactant and the oxidizing second reactant as discussed further below. As used herein, the term "consumable" refers to the quality of changing form or reacting such that the metallic particulate 101, and thus the metal first reactant, is substantially no longer isolated from water 107.

In this regard, matrix 102 is configured to limit unintended reactions between water 107 and metallic particulate 101 such that no additional barrier between the metallic portion of spacer 100 and water 107 is required. Thus manufacture of cartridge 10 relative to conventional systems is simplified in that no separate container is required for water 107. The metallic particulate 101 of spacer 100 can include as the first metal reactant metals such as aluminum, magnesium, iron, sodium, potassium, titanium, and combinations thereof. In the illustrated embodiment, metallic particulate 101 includes aluminum and it is believed that aluminum having any purity is suitable for use as the reactive metal, and therefore, any alloy of aluminum is suitable for use as a metallic insert of the present invention. By way of example and not limitation, in alternative embodiments spacer 100 can include one of the following metallic materials: a woven metal mesh, a metal wool, discrete metal pellets, and a combination thereof. In these alternative embodiments, the metallic material is coated with the binding agent.

The matrix 102 is a material that can function to bind metallic particulate 101 together. Other desirable characteristics of the matrix are: it is soluble and when solvated can be mixed with particulate 101, it can be easily dried or cured to form the desired component of cartridge 10, and it is consumable during a rapid reaction between the metal first reactant and the oxidizing second reactant. In the illustrated embodiment, the matrix includes nitrocellulose. By way of example and not limitation, the matrix can include one of the following: nitrocellulose, dextrin, guar gum, gum Arabic, shellac, synthetic organic polymers, other organic materials, and a combination thereof. In the illustrated embodiment, the percentage of metallic particulate 101 relative to the combined weight of metal particulate 101 and matrix 102 in spacer 100 is preferably between about 80% and about 99.9%; more preferably between about 88% and 98%; and most preferably between about 92% and 96%. It should be appreciated that structures other than spacer 100 disclosed herein that are formed of metallic particulate 101 embedded in matrix 102 have substantially similar compositions to that of spacer 100.

It should be appreciated that the water can be pure or can contain various contaminates such as salts, metals, minerals, etc. The water can be a liquid or substantially solidified by combination with a gelatinizing agent. By way of example and not limitation, the oxidizing agent can include water, hydrogen peroxide or other oxidizing compound having hydrogen contained therein. The ratio of the metallic first reactant, for example, aluminum; and the oxidizing agent, for example, water 107; is generally equal to the stoichiometric ratio of the oxidizing reaction between the two components. Therefore, when the metallic first reactant is aluminum and the oxidizing second reactant is water, the stoichiometric ratio is about one to one, and aluminum and water are contained in cartridge 10 in a ratio of about one to one. Referring to metal particles 101, they are provided such that the reactive metal contained therein is in an appropriate ratio. For example, if metal particles 101 are essentially pure aluminum, the mass of metallic particles 101 contained within the cartridge 10 is generally equal to the mass of water 107 in cartridge 10. Likewise, if metallic particles 101 include fifty percent by weight of nonreactive contaminants, then the mass of metallic particles 101 contained within cartridge 10 is generally two times the mass of water 107 in cartridge 10.

Spacer 100 is configured to position ignition assembly 70 within cavity 66 such that assembly 70 is near cap 50 and in this regard, spacer 100 is a structural component. In alternative embodiments wall 24 of case 20 includes tabs or ribs that are configured to position ignition assembly 70 within cavity 66. Spacer 100 is configured to extend within cavity 66 from closed end 22 to assembly 70. Such that one end of spacer 100 is near surface 23 and another end of spacer 100 is near surface 73. It should be appreciated that while spacer 100 is configured to mechanically separate assembly 70 from closed end 22, in some embodiments spacer 100 is movable relatively one or both of assembly 70 and closed end 22, and in addition, might not be in direct contact with one or both of assembly 70 and closed end 22.

Ignition assembly 70 is configured as an igniter and includes a primary ignition block 72 having a recess 74 formed therein. As used herein, the term "igniter" refers to a structure configured to generate sufficient temperature to initiate, i.e. ignite, a reaction between reactants. A passageway 78 is defined from recess 74 through a base portion of primary ignition block 72 to a base surface 73 defined by the base portion of primary ignition block 72. Recess 74 is dimensioned to receive a pre-ignition block 76. In the illustrated embodiment, both primary ignition block 72 and pre-ignition block 76 are generally cylindrical.

Primary ignition block 72 includes thermite. As used herein, the term "thermite" refers to a composition that includes a metal oxide that acts as an oxidizing agent and a metal to be oxidized by the oxidizing agent. By way of example and not limitation, the metal oxide can be black or blue iron oxide ($Fe_3O_4$), red iron (III) oxide ($Fe_2O_3$), manganese oxide ($MnO_2$), Chromium (III) oxide $Cr_2O_3$, cuprous oxide ($Cu_2O$), cupric oxide, (copper (II) oxide, CuO), other metal oxide, or a combination thereof. The metal to be oxidized can be aluminum or other reactive metal.

In one embodiment, the metal oxide is iron oxide ($Fe_3O_4$). Preferably, the thermite is formed together with a binding agent into a desired shape and the binding agent is a nitrocellulose lacquer. In this regard, the particles of thermite are retained within a matrix of nitrocellulose. It should be appreciated that in another embodiment, the primary ignition block 72 is formed of thermite that is configured to retain its shape without a binder, i.e. compressed or solid thermite. In a further alternate embodiment, the thermite can be in the form of particles that are retained in a container or wrapping (not shown) that is configured to support and shape primary ignition block 72.

Pre-ignition block 76 is formed of a pre-ignition compound that includes potassium perchlorate, magnesium, and aluminum. Pre-ignition block 76 includes an element 82. Element 82 is configured to electrically connect cap 50 with a region adjacent one end of passageway 78 of primary ignition block 72. It should be appreciated that element 82 can be any electrical element configured to generate heat when exposed to an electrical differential. In one embodiment element 82 is a bridge wire. As used herein, the term "bridge wire" refers to a relatively thin resistance wire used to ignite a pyrotechnic composition.

Pre-ignition block 76 is formed by a molding process in which the pre-ignition compound is formed of particles that are mixed with a binding agent and molded to a desired shape. The binding agent can be a lacquer such as nitrocellulose lacquer and in such an embodiment, pre-ignition block 76 is formed of particles of the pre-ignition compound embedded in a matrix of nitrocellulose. In the illustrated embodiment, the mixture of binding agent and pre-ignition compound is molded around element 82 such that element 82 is also embedded in the matrix of nitrocellulose. It should be appreciated that in other embodiments, pre-ignition block 76 can include solid or particulate components and can be positioned within a container or wrapping (not shown) that is configured to support and shape pre-ignition block 76. Further, element 82 can be positioned around pre-ignition block 76 or through a passageway formed therein after initial shaping of the pre-ignition block is complete.

Pre-ignition block 76 is configured to ignite when element 82 is exposed to an electrical voltage differential that is preferably between about 1 volts and about 100 volts, more preferably between about 5 volts and about 30 volts, and even more preferably between about 10 volts and about 15 volts, and most preferably about 12 volts.

Pre-ignition block 76 is configured to generate a temperature upon ignition that is sufficient to ignite primary ignition block 72. Primary ignition block 72 is configured to generate a temperature after ignition that is sufficient to initiate an oxidation reaction between the metal first reactant, and the oxidizing second reactant. In other embodiments, the ignition of composition 72 is sufficient to initiate a similar oxidation reaction that generates hydrogen. Primary ignition block 72 is configured to generate a temperature that is preferably between about 2,500 degrees Fahrenheit and about 6,000 degrees Fahrenheit, more preferably between about 3,250 degrees Fahrenheit and about 5,000 degrees Fahrenheit, and even more preferably between about 3,500 degrees Fahrenheit and about 4,500 degrees Fahrenheit. Ignition assembly 70 is configured to initiate a reaction between spacer 100 and water as will be discussed further below.

As shown in FIGS. 2 and 3, passageway 32 of closed end 22, passageway 108 of spacer 100, and passageway 78 of primary ignition block 72, are aligned to form a continuous primary passageway that connects outer surface 29 of closed end 22 with element 82. The primary passageway is configured to receive a conductor 112 that is configured to electrically contact element 82 at an end 116 such that element 82 is electrically connected with a button 114. Conductor 112 is also configured to be electrically insulated from other components of cartridge 10. By way of example and not limitation, conductor 112 includes one of the following: a solid metal wire, stranded metal wire, aluminum, silver, other metal, carbon, other conductive non-metal, and a combination thereof. In one embodiment conductor 112 is an insulated metallic wire. Button 114 is configured to provide a surface for electrical contact that is positioned exterior of cartridge 10, and button 114 is configured to be received in axial recess 31 of closed end 22. By way of example and not limitation, button 114 includes one of the following: aluminum, silver, other metal, carbon, other conductive non-metal, and a combination thereof.

In this manner, an electrically conductive path P is formed that extends from outer surface 29 of closed end 22 to outer surface 56 of cap 50. Path P is configured to conduct an electric current such that the pre-ignition block 76 can be ignited as will be discussed below with regard to the operation of the present invention.

Referring now to FIG. 4, cartridge 10 is configured to be received by a reaction assembly 200 and activated therein. Reaction assembly 200 includes a hydrogen containment vessel 204, a magazine 240, a loading device 241 and a firing chamber 250. Containment vessel 204 has a wall 205 that defines a cavity 206. A pressure sensor 208 is fluidly connected through wall 205 to cavity 206. In the illustrated embodiment, pressure sensor 208 is configured to generate a signal indicative of the pressure within cavity 206 and includes an operator interface.

A discharge tube 214 defines a passageway that fluidly connects cavity 206 with a device or region outside of reaction assembly 200. A control valve 212 positioned in discharge tube 214 and is configured to control the flow of fluid through discharge tube 214. In one embodiment, control valve 212 is a pressure regulator valve that is configured to maintain a predetermined pressure within cavity 206. A valve 216 is positioned on wall 205 and is configured to vent cavity 206 to the region outside of vessel 204 at a predetermined pressure, i.e., valve 216 is configured as a pressure relief valve.

A flow control mechanism 251 is positioned between firing chamber 250 and vessel 204. Mechanism 251 is configured to provide for the discharge of gas from firing chamber 250 into cavity 206. Mechanism 251 is also configured to prevent flow of gas from cavity 206 into firing chamber 250. Flow control mechanism 251 is electrically connected to controller 290 and is configured to be actuated by controller 290.

Continuing to refer to FIG. 4, magazine 240 is configured to supply a plurality of cartridges 10 to firing chamber 250 via a loading device 241. Loading device 241 is positioned between magazine 240 and firing chamber 250 and is configured to convey a cartridge 10 from magazine 240 to firing chamber 250. In the illustrated embodiment, magazine 240 is detachable from the remainder of firing assembly 200. It should be appreciated that a plurality of magazines 240 are interchangeable such that subsequent magazines 240 can replace an initial magazine 240 and in this manner a supply of cartridges 10 can be provided to firing assembly 200 and more specifically to firing chamber 250.

Firing chamber 250 is best seen in FIG. 5 and includes a breech block 253 and a generally tubular chamber wall 252. Breech block 253 defines interior tabs 256 that are configured to engage circumferential groove 28 of cartridge 10. Breech block 253 is configured to be openable such that cartridge 10 can be received therein.

Breech block 253 of firing chamber 250 is generally cup-shaped and includes a back wall 254. Generally tubular sidewall 252 that extends away from breech block 253 toward an open end 255. Sidewall 252 and breech block 253 define a bore 257 that is configured to receive a cartridge 10. Wall 252 defines a shoulder 259 that separates a throat 261 from bore 257. Throat 261 has a diameter near shoulder 259 that is smaller than the diameter of bore 257. In one embodiment, throat 261 is generally cylindrical. Firing chamber 250 is positioned such that open end 255 is adjacent flow control mechanism 251 such that gases can be directed through throat 261 into flow control mechanism 251.

Breech block 253 is configured to provide for the conveyance of cartridge 10 from loading device 241 into bore 257 of firing chamber 250. When cartridge 10 has been loaded into bore 257, tabs 256 engage circumferential groove 28 of cartridge 10 such that cartridge 10 is securely positioned within firing chamber 250. As can be seen in FIG. 6, firing chamber 250 is positioned such that solid residue and waste 67 generated during a discharge of cartridge 10 is retained within bore 257, and in the illustrated embodiment, cavity 66 of cartridge 10. In this regard, firing chamber 250 is oriented such that open end 255 is positioned above back wall 254, and more specifically, firing chamber 250 is oriented substantially vertically such that open end 255 is generally over back wall 254. It should be appreciated that alternatively, discharge system 200 can be configured such that firing chamber 250 is in motion during a discharge of cartridge 10 and that such motion creates a force directed toward back wall 254 such that solids are retained within cavity 66. In such an embodiment cartridge 10 can be operated generally without regard to the strength and direction of gravitational forces.

In the illustrated embodiment, breech block 253 includes a contact 258 that is positioned centrally relative to back wall 254 and is electrically isolated from firing chamber 250. Contact 258 is configured to electrically engage button 114 of cartridge 10 when cartridge 10 is positioned within bore 257. Contact 258 is electrically connected to controller 290 such that contact 258 can form part of an electrical circuit that includes electrical path P of cartridge 10.

In this regard, breech block 253 and tubular sidewalls 252 are formed of an electrically conductive material. When a cartridge 10 is positioned within bore 257 and breech block 253 is in the closed position, electrically conductive button 114 of cartridge 10 is electrically connected to contact 258 and cap 50 of cartridge 10 is in electrical contact with tubular sidewalls 252 of firing chamber 250. In this manner, an electrical circuit is formed that electrically connects tubular sidewall 252 and breech block 253 via electrical path P described above.

Continuing to refer to FIG. 6, after a cartridge 10 is discharged, a spent cartridge 10' remains. Some components of spent cartridge 10' are analogous to components of cartridge 10 and will be designated by identical reference numbers and the prime symbol. In this regard, spent cartridge 10' includes a case 20', a button 114', a cavity 66', and a cap 50'. These components of spent cartridge 10' can be generally understood from the foregoing descriptions of the corresponding components of cartridge 10.

In the illustrated embodiment, controller 290 is configured to control the electrical connection between contact 258 and a voltage source (not shown). In this manner, controller 290 is configured to control the discharge of cartridge 10. As used herein, the term "discharge" refers to the reaction of the contents of cartridge 10 to form hydrogen such that hydrogen passes through opening 51. Further, loading device 241, contact 258 of firing chamber 250, pressure sensor 208 and valve 212 are electrically connected to a controller 290. Controller 290 is configured to activate loading device 241, firing chamber 250, and valve 212 based upon predetermined parameters or instructions input by an operator. In one embodiment, controller 290 is an electronic computer that includes a storage device and a data input device.

In another alternate embodiment, a mechanical firing device such as a percussion cap (not shown) is utilized to ignite the pre-ignition block 76 instead of element 82.

In an alternative embodiment, case 20 is formed of a metallic particulate 101 embedded in a matrix 102 as described with regard to spacer 100 above. In this embodiment, the total amount of a reactive metal in the cartridge 10 is in stoichiometric proportions to the total amount of water 107 as it is in the illustrated embodiment. Therefore spacer 100 would contain less aluminum in this embodiment than in the illustrated embodiment wherein the mass of aluminum contained in spacer 100 is generally equal to the mass of water 107.

It should be appreciated that nitrocellulose is consumed by the reaction. Therefore structures formed from nitrocellulose and the metal first reactant in various embodiments, such as spacer 100 or case 20, are consumed by the reaction between aluminum and water to generate hydrogen. It is believed that consumption of the matrix generates a relatively small amount of waste as either a solid or a gas.

The present invention can be better understood in light of the following description of the operation thereof. In the illustrated embodiment, cartridge 10 is configured to generate hydrogen by the reaction of spacer 100 with water contained within cavity 106. According to a method provided by the present invention, a cartridge 10 is positioned within firing chamber 250. A voltage is applied by controller 290 to contact 258 such that an electrical current flows from button 114, along conductor 112, through element 82, through cap 50, through sidewalls 252, and to the electrical ground. The current is sufficient to ignite pre-ignition block 76 and thus assembly 70 such that spacer 100 and the water in the cavities 106 are raised to a temperature sufficient to initiate an oxidation reaction between the spacer 100 and water 107.

The principle products of this reaction are hydrogen gas and a metallic oxide. Pressures generated within cavity 66 are sufficient to rupture cap 50 and form opening 51. It is believed that a substantial portion of solid reaction products such as metal oxide and other solids generated by the discharge of cartridge 10 remain within cavity 66 or attached to case 20. Hydrogen gas passes from cavity 66 through opening 51 and flow control mechanism 251 into cavity 206 of containment vessel 204. The quantity of hydrogen gas and temperature of the hydrogen gas discharged from cartridge 10 determines the pressure within cavity 206. Valve 212, shown in FIG. 4, operates to provide for the discharge of hydrogen gas from cavity 206. Additional cartridges 10 can be discharged to generate additional hydrogen gas such that the pressure with cavity 206 is maintained at a predetermined level. In this manner cavity 206 acts as a reservoir configured to provide a continuous supply of hydrogen gas to a device configured to consume the hydrogen. It is believed that operation of the present invention can provide a source of high pressure hydrogen.

In all embodiments, spacer 100 is configured such that sufficient quantities of metallic particulate 101 and oxidizing agent, such as water 107, are positioned such a rapid reaction between metallic particulate 101 and the oxidizing agent can be initiated by assembly 70. Once the rapid hydrogen generating reaction has begun, it is believed that it will continue until one or both reactants are consumed. In this regard, it is believed that the reaction will continue until substantially all of the metallic particulate 101 and that all components of cartridge 10 that were formed of the reactive metal will be consumed during the rapid generation of hydrogen.

Referring now to specific uses of cartridge 10, cartridge 10 can be configured to provide hydrogen produced from cartridge 10 such that sufficient pressure is generated to bond metals, and more specifically, dissimilar metals. In this regard, cartridge 10 can be used to bond dissimilar metals in the manner than conventional explosive welding bonds metals.

Figure 7:
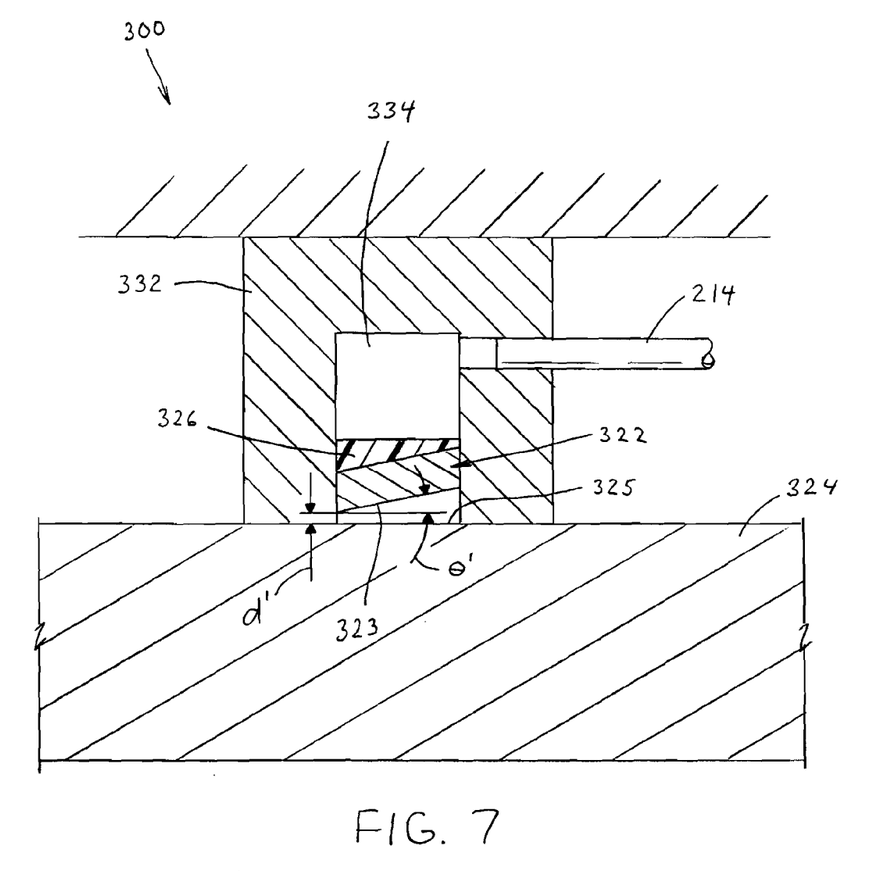
FIG. 7 is a cutaway side view of a fixture for welding dissimilar metals utilizing the discharge of a cartridge showing a flyer and an anvil positioned according to the present invention.

In one such embodiment, welding fixture 300 is configured such that an object can be welded to a relatively much larger object such as a tank or a warship. Referring now to FIG. 7, welding fixture 300 includes a welding block 332 that defines an acceleration chamber 334. Acceleration chamber 334 is fluidly connected to reaction assembly 200 (not shown) via discharge tube 214 of reaction assembly 200. Acceleration chamber 334 is configured to receive a flyer 322. A wad 326 is positioned adjacent to flyer 322 such that wad 326 is between flyer 322 and discharge tube 214. In one embodiment, wad 326 is adhered to flyer 322. By way of example and not limitation, wad 326 is formed from one of the following: plastics such as lexan, high density polypropylene, paper, natural fibers, wood, metal, and a combination thereof. It should be appreciated that a surface of flyer 322 can be configured to function as a wad and in such an embodiment, a wad 326 would not be present. Wad 326 is configured to protect flyer 322 from heat and particle damage.

Welding fixture 300 is configured such that it is in a substantially fixed position relative to an anvil 324. Flyer 322 is positioned such that it is offset from a surface 325 of anvil 324 by a distance d'. Distance d' is preferably between about 0.0 inches and about 0.25 inches, more preferably d' is between about 0.05 inches and 0.20 inches, even more preferably d' is between about 0.10 inches and about 0.15 inches. A surface 323 of flyer 322 is positioned at an angle $\Theta'$ relative to an imaginary line that is parallel surface 325 of anvil 324. Preferably, angle $\Theta'$ is between about 0 degrees and about 24 degrees more preferably, angle $\Theta'$ is between about 7 degrees and about 17 degrees, even more preferably, angle $\Theta'$ is between about 10 degrees and about 15 degrees, and even more preferably, angle $\Theta'$ is about 12 degrees. Flyer 322 is shaped such that surface 323 is configured to adhere to surface 325 of anvil 324 after welding. As shown in FIG. 7, flyer 322 can be shaped such that surface 323 is parallel to another surface of flyer 322. Alternatively, surfaces of flyer 322 other than flyer surface 323 can have shapes and orientations that are dependent on their final finished configuration, and not the orientation or shape of flyer surface 323.

Figure 8:
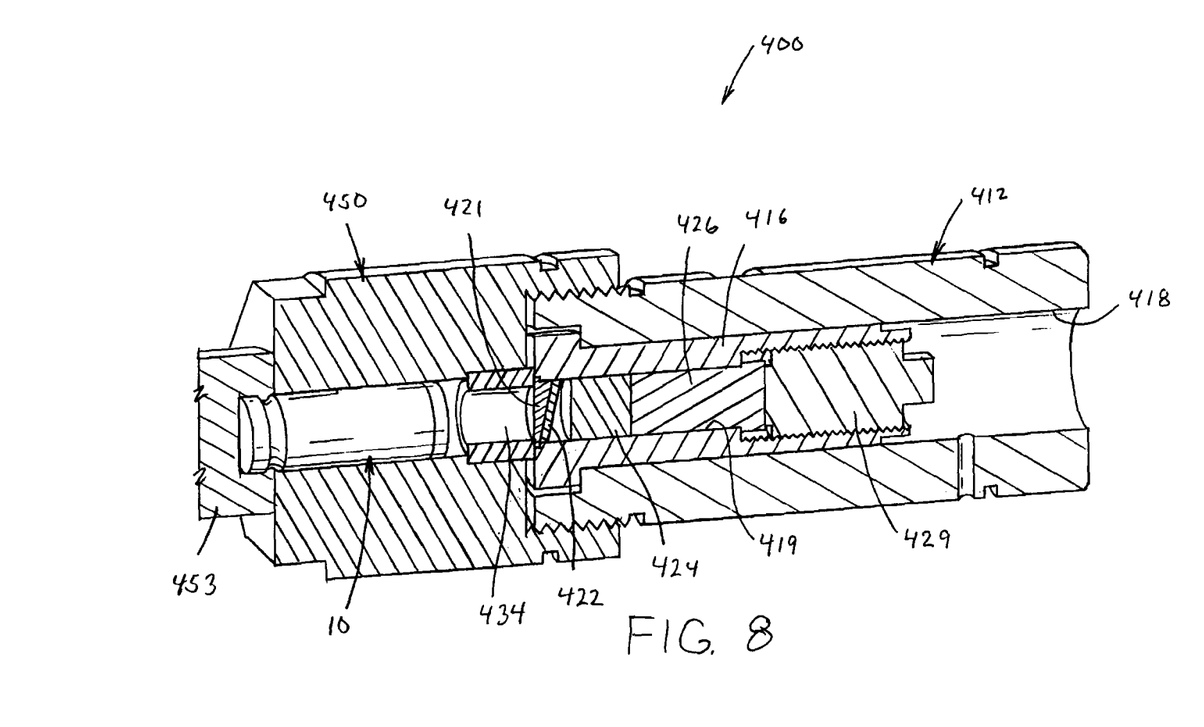
FIG. 8 is a cutaway perspective view of a fixture for welding dissimilar metals, showing a cartridge, a flyer, and an anvil.

Referring now to FIG. 8, in another embodiment high pressure and high temperature hydrogen generated from cartridge 10 can be used to weld together objects of dissimilar metals in a self contained welding fixture 400. Welding fixture 400 includes a welding housing 412 that is engaged to a welding block firing chamber 450. Welding housing 412 is configured to receive a generally cylindrical welding casing 416 in a first bore 418 formed within welding housing 412. Welding housing 412 defines a welding second bore 419 that is configured to receive a wad 421, a flyer 422, an anvil 424, a backer 426, and a threaded plug 429.

Figure 9:
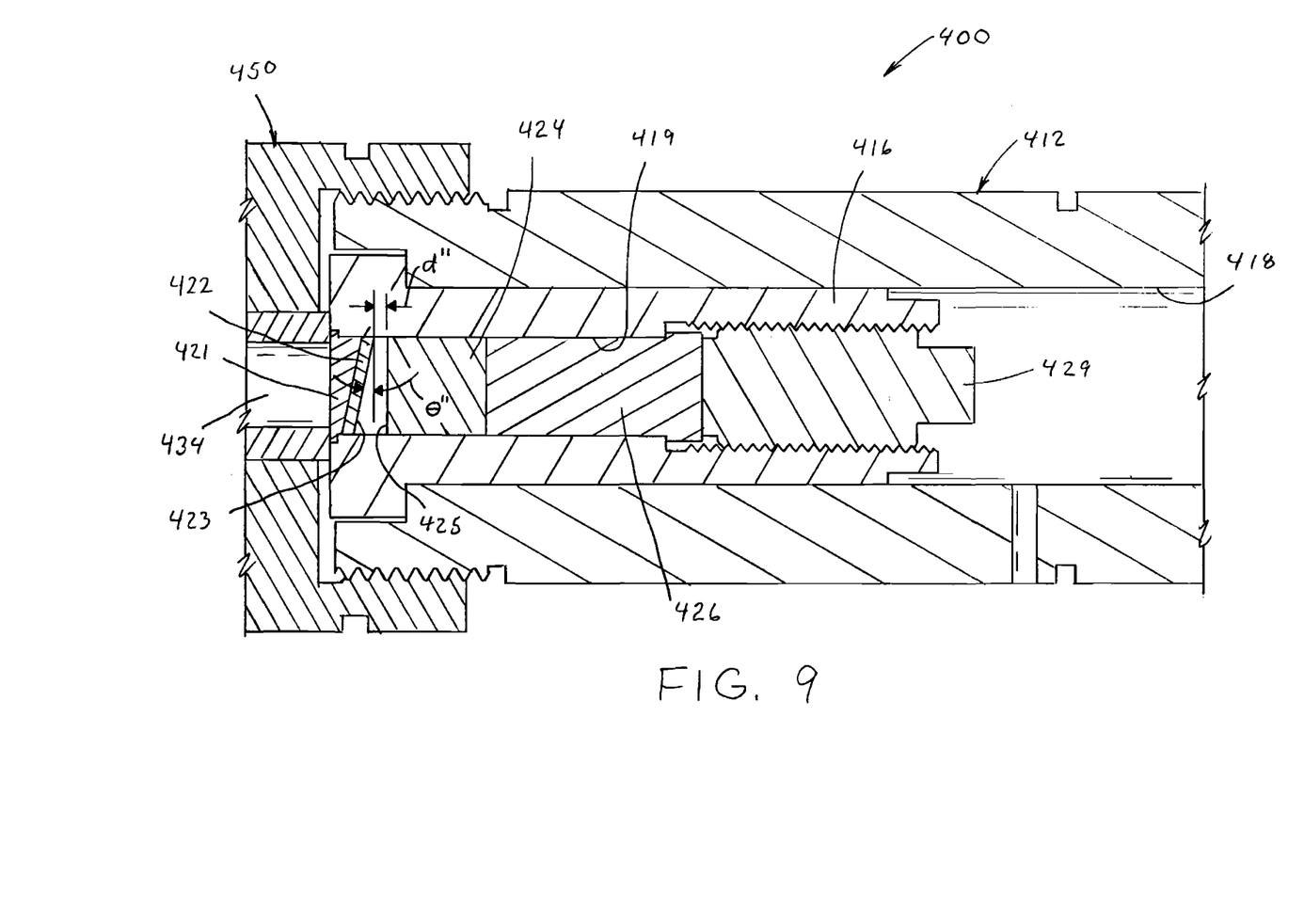
FIG. 9 is an enlarged cutaway side view of a portion of the fixture shown in FIG. 8.

As shown in FIG. 9, flyer 422 is positioned such that it is offset from a surface 425 of anvil 424 by a distance d". Distance d" is preferably between about 0.0 inches and about 0.25 inches, more preferably d" is between about 0.05 inches and 0.20 inches, even more preferably d" is between about 0.10 inches and about 0.15 inches. A surface 423 of flyer 422 defines an angle $\ominus$" relative to an imaginary line that is parallel to surface 425 of anvil 424. Preferably, angle $\ominus$" is between about 0 degrees and about 24 degrees more preferably, angle $\ominus$" is between about 7 degrees and about 17 degrees, even more preferably, angle $\ominus$" is between about 10 degrees and about 14 degrees, and even more preferably, angle $\ominus$e" is about 12 degrees. A wad 421 is positioned adjacent to flyer 422 such that wad 421 is between flyer 422 and firing chamber 450. In one embodiment, wad 421 is adhered to flyer 422. By way of example and not limitation, wad 421 is formed from one of the following: plastics such as lexan, high density polypropylene, paper, natural fibers, wood, metal, and a combination thereof. It should be appreciated that a surface of flyer 422 can be configured to function as a wad and in such an embodiment, a wad 421 would not be present. Wad 421 is configured to protect flyer 422 from heat and particle damage.

Continuing to refer to FIG. 9, Wad 421 is positioned such that flyer 422 is between wad 421 and anvil 424. Anvil 424 is positioned within welding second bore 419 adjacent to backer 426. In a preferred embodiment, backer 426 is adhered to anvil 424 by an adhesive or by welding. Backer 426 is dimensioned such that anvil 424 is positioned away from flyer 422 predetermined distance d". Threaded plug 429 is configured to retain backer 426, anvil 424, and flyer 422 within welding second bore 419 during and after a welding operation. Plug 429 is configured to be removed from bore 419 to aid in removal of the final product, i.e., the welded together flyer 422 and anvil 424.

Flyer 422 is shaped such that surface 423 is configured to adhere to surface 425 of anvil 424 after welding. As shown in FIG. 9, flyer 422 can be shaped such that surface 423 is parallel to another surface of flyer 422. Alternatively, surfaces of flyer 422 other than flyer surface 423 can have shapes and orientations that are dependent on their final finished configuration, and not the orientation or shape of flyer surface 423. It should be appreciated that flyers 322 and 422 and anvils 324 and 424 can be cylindrical or spherical.

Referring now to firing chamber 450 as shown in FIG. 8, firing chamber 450 is substantially similar to firing chamber 250 in the way in which it is configured to receive and discharge cartridge 10. Firing chamber includes a breech block 453 defines an acceleration chamber 434. One side of acceleration chamber 434 is open to wad 421 and the other side of acceleration chamber 434 is open to cartridge 10 within firing chamber 450 such that an aluminum water reaction can be initiated.

Figure 7A:
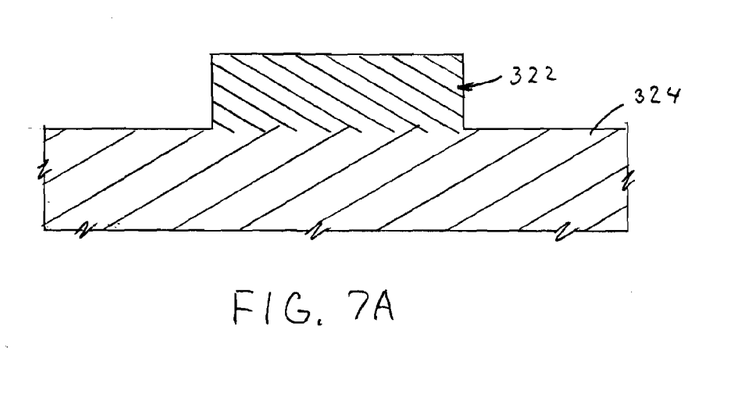
FIG. 7A is a view of a bonded product made according to the method of the present invention.

The dissimilar welding embodiments of the present invention can be better understood by a discussion of the operation thereof. Referring now to the operation of welding fixture 300 shown in FIG. 7 and described above, welding fixture is fixedly positioned relative to anvil 324. It should be understood that anvil 324 can be any suitable metallic object, but by way of example and not limitation, anvil 324 can be a portion of a warship, tank, or armor thereof. For items such as this conventional welding would cause deterioration of the desired properties of the metals. A flyer 322 is positioned within acceleration chamber 334 along with wad 326 as shown in FIG. 7. Valves between acceleration chamber 334 are positioned to transfer pressure as desired from reaction assembly 200. A cartridge 10 is discharged. The resulting pressure wave travels through acceleration chamber 334 and causes flyer 322 to accelerate into anvil 324 with sufficient force that a bond is formed. As can be seen in FIG. 7A, flyer 322 and anvil 324 are bonded together and can be used as is or further machined to create a finished part. It should be understood that in an alternative embodiment, a firing chamber can be configured with an integral breech block as shown in FIG. 8, firing chamber 450, such that a pressure wave is introduced into from cartridge 10 directly into acceleration chamber 334.

Referring now to the operation of welding fixture 400, a cartridge 10 is positioned in firing chamber 450. Cartridge 10 is discharged and a pressure wave is transmitted through acceleration chamber 434. When the pressure wave impacts wad 421, flyer 422 is moved into contact with anvil 424 with sufficient force such that flyer 422 and anvil 424 are welded together. As illustrated, welding fixture 400 can then be disassembled for removal of the welded part by disengaging welding housing 412 from firing chamber 450, removing welding casing 416 from bore 418, and removing plug 429.

After welding, the components joined according to either method described above are finished by known machining methods. It is believed that finished components produced by the above methods can be made from less total material than components made from conventional explosive bonding methods. It is believed that this is because of the contained, localized nature of the welding. In addition, it is believed that the use of wad 326 or wad 421 acts to shield flyer 322 or 422 respectively from distorting forces, or alternatively, to evenly distribute such forces.

By way of example and not limitation, the method described above can be used to bond two or more of the following materials: metal, ceramics, copper, steel, stainless steel, aluminum, and a combination thereof.

It should be appreciated that in an alternative embodiment, the structure and function can be achieved with fewer components than illustrated here. In this regard, welding housing 412, welding casing 416, backer 426 and plug 429 can be integrated into just a single component.

Figure 10:
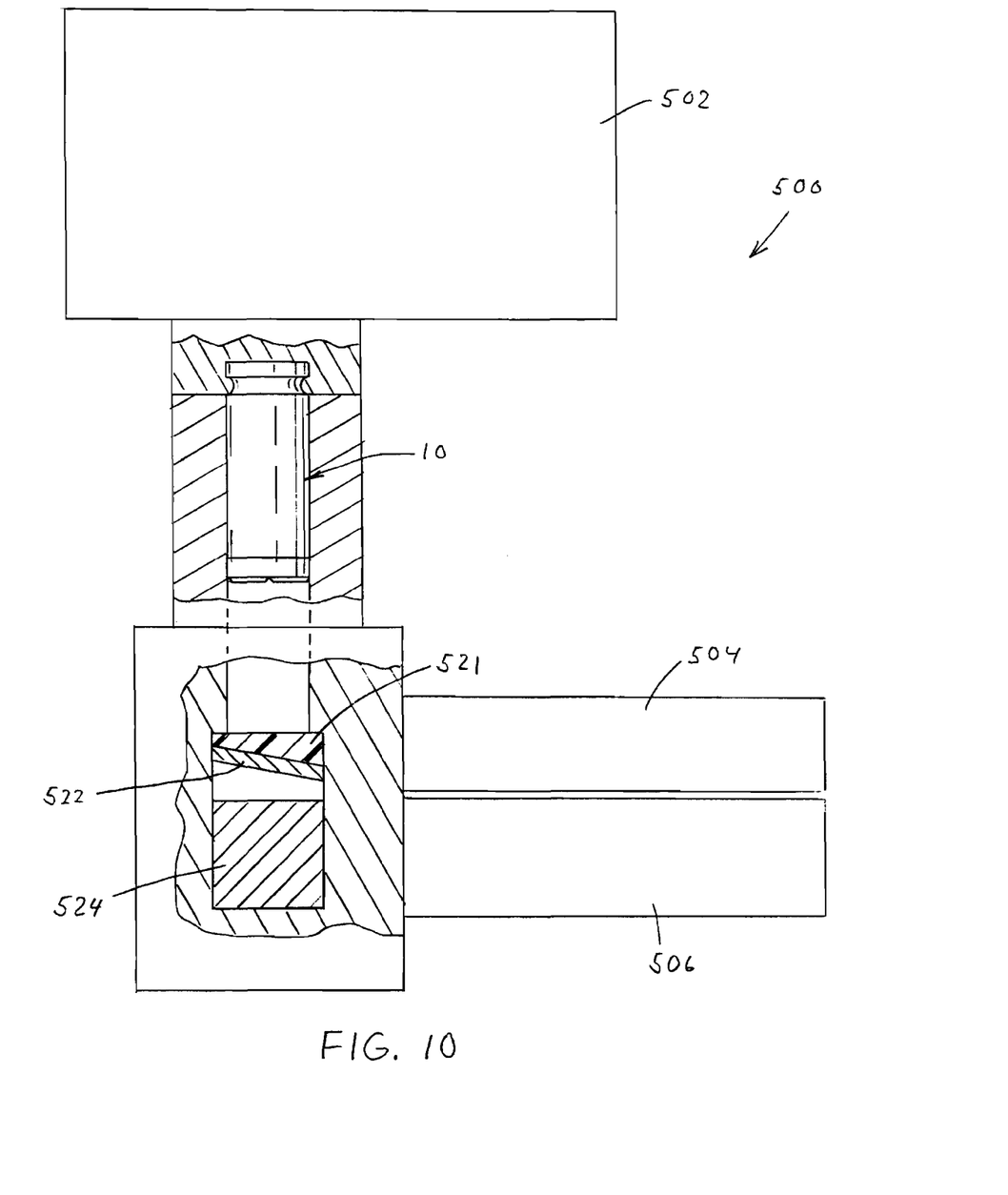
FIG. 10 is a schematic view of an automated bonding fixture according to an alternative embodiment of the present invention.

Referring now to FIG. 10, in another alternative embodiment, a welding fixture 500 is provided. Welding fixture 500 is substantially similar to welding fixture 400. Structure shown with 500 series reference numbers can be understood in light of the description above regarding like 400 series reference numbers. Welding fixture 500 includes a magazine 502 for multiple cartridges 10, a magazine 504 for multiple flyers 522, and a magazine 506 for multiple anvils 524. In this regard welding fixture 500 is configured such that cartridge 10, flyer 522, and anvil 524 are automatically loaded into their respective positions within welding fixture 500. The controls and automatic operation of welding fixture 500 can be understood in light of the description of the controls and automatic operation of reaction assembly 200 above. After discharge of a cartridge 10 and bonding of flyer 522 and anvil 524, the bonded parts and spent cartridge residue are cleared. Another cycle is initiated: magazine 502 loads a next cartridge 10, magazine 504 loads a next wad 521 and flyer 522, and magazine 506 loads a next anvil 524. Welding fixture 500 is configured such that many cycles can occur, producing many parts, before attention by a human operator is required. In one embodiment, wad 521, flyer 522 and anvil 524 are prepositioned together in a magazine and loaded in one step. The mechanism for unloading and loading parts automatically can be one of the methods generally understood by those skilled in the art of automatic manufacturing.

The present invention applies generally to cartridges for the formation of hydrogen. More specifically, a reusable or expendable cartridge is provided for the on-demand and nearly instantaneous generation of hydrogen at high temperatures and at high pressures. While the present invention has been illustrated and described with reference to preferred embodiments thereof, it will be apparent to those skilled in the art that modifications can be made and the Invention can be practiced in other environments without departing from the spirit and scope of the invention, set forth in the accompanying claims.

Having described the invention, the following is claimed:

1. A fixture for bonding materials, the fixture comprising:
    a cartridge for the generation of hydrogen, that includes a case that defines an interior cavity, an igniter positioned within the cavity, an oxidizing agent positioned within the cavity; a structural component positioned within the cavity, the structural component being formed of a particulate embedded in a matrix and the particulate includes a metallic material, wherein the structural component is configured such that the metallic material and the oxidizing agent react together to generate hydrogen after the igniter generates sufficient heat to remove the matrix from the structural component and to initiate the reaction between the metallic material and the oxidizing agent; and
    a flyer;
    wherein the cartridge is positioned relative to the flyer such that when the cartridge is discharged, the flyer is displaced into an anvil with sufficient force that the flyer is bonded to the anvil.

2. A fixture according to claim 1, wherein a wad is positioned between the cartridge and the flyer.

3. A fixture according to claim 2, wherein the wad is adhered to the flyer.

4. A fixture according to claim 1, wherein the flyer has a first bonding surface and the anvil has a second bonding surface and the first bonding surface is positioned at an angle relative to an imaginary line that is parallel to the second bonding surface.

5. A fixture according to claim 1, wherein the anvil is contained within the fixture.

6. A fixture according to claim 5, wherein the anvil is adhered to a backer.

7. A method of bonding, said method comprising the steps of:
    providing a cartridge for the generation of hydrogen, that includes a case that defines an interior cavity, an igniter positioned within the cavity, an oxidizing agent positioned within the cavity; a structural component positioned within the cavity, the structural component being formed of a particulate embedded in a matrix and the particulate includes a metallic material, wherein the structural component is configured such that the metallic material and the oxidizing agent react together to generate hydrogen after the igniter generates sufficient heat to remove the matrix from the structural component and to initiate the reaction between the metallic material and the oxidizing agent; and a flyer wherein the cartridge is positioned relative to the flyer such that when the cartridge is discharged, the flyer is displaced into an anvil with sufficient force that the flyer is bonded to the anvil;
    discharging the cartridge; and
    bonding the flyer to the anvil.

8. A method according to claim 7, wherein a wad is positioned between the cartridge and the flyer.

9. A method according to claim 8, wherein the wad is adhered to the flyer.

10. A method according to claim 7, wherein the flyer has a first bonding surface and the anvil has a second bonding surface and the first bonding surface is positioned at an angle relative to an imaginary line that is parallel to the second bonding surface.

11. A method according to claim 7, wherein the anvil is contained within the fixture.

12. A method according to claim 11, wherein the anvil is adhered to a backer.

13. A method for bonding, the method comprising the steps of:
    providing a cartridge that includes a case that defines an interior cavity, an igniter that is configured to ignite when an electrical element embedded therein is exposed to an electrical voltage differential, an insert configured to define a plurality of chambers within the cavity and the insert includes aluminum particles that are embedded in a nitrocellulose matrix, an oxidizing agent including chemically bonded hydrogen and positioned within each chamber, and wherein the igniter is configured to initiate a reaction between the aluminum particles and the oxidizing agent that generates hydrogen, and a flyer;
    discharging the cartridge;
    propelling the flyer;
    contacting the flyer with an anvil with sufficient force that the flyer is bonded to the anvil to form a bonded part.

14. A method according to claim 13, wherein a wad is positioned between the cartridge and the flyer.

15. A method according to claim 14, wherein the wad is adhered to the flyer.

16. A method according to claim 13, wherein the flyer has a first bonding surface and the anvil has a second bonding surface and the first bonding surface is positioned at an angle relative to an imaginary line that is parallel to the second bonding surface.

17. A method according to claim 13, wherein the anvil is contained within the fixture.

18. A method according to claim 13, wherein the anvil is adhered to a backer.

19. A method according to claim 13, further comprising the steps of:
    ejecting the bonded part;
    loading another cartridge from a magazine automatically;
    loading another flyer from a magazine automatically;
    loading another anvil from a magazine automatically;
    discharging the another cartridge automatically such that another bonded part is formed; and
    ejecting the another bonded part.

20. A method according to claim 19, wherein the case is formed of the aluminum embedded in nitrocellulose.

* * * * *